United States Patent [19]

Cook

[11] Patent Number: 5,731,903
[45] Date of Patent: Mar. 24, 1998

[54] VIRTUAL IMAGE INSTRUMENT PANEL DISPLAY

[75] Inventor: Lacy G. Cook, El Segundo, Calif.

[73] Assignee: Hughes Electronics, Los Angeles, Calif.

[21] Appl. No.: 735,151

[22] Filed: Oct. 22, 1996

Related U.S. Application Data

[63] Continuation of Ser. No. 971,799, Nov. 5, 1992, abandoned.

[51] Int. Cl.[6] .............................. G02B 27/14; G09G 3/02
[52] U.S. Cl. ................ 359/633; 359/630; 359/632; 345/7
[58] Field of Search ...................... 359/13–14, 364–366, 359/618, 629–633, 856–861, 729; 340/705, 980; 345/7–9

[56] References Cited

U.S. PATENT DOCUMENTS

| | | | |
|---|---|---|---|
| 3,697,154 | 10/1972 | Johnson | 359/631 |
| 4,012,123 | 3/1977 | Fuller | 359/630 |
| 4,240,702 | 12/1980 | Casas | 359/729 |
| 4,740,780 | 4/1988 | Brown et al. | 345/7 |
| 4,973,139 | 11/1990 | Weinbrauch et al. | 359/630 |
| 5,033,818 | 7/1991 | Barr | 359/630 |
| 5,053,755 | 10/1991 | Smith et al. | 359/630 |
| 5,121,099 | 6/1992 | Hegg et al. | 359/630 |
| 5,140,465 | 8/1992 | Yasui et al. | 359/631 |
| 5,162,828 | 11/1992 | Furness et al. | 359/618 |
| 5,162,928 | 11/1992 | Taniguchi et al. | 359/630 |

FOREIGN PATENT DOCUMENTS

| | | |
|---|---|---|
| 0431488 | 6/1991 | European Pat. Off. |
| 0482805 | 4/1992 | European Pat. Off. |
| 62-196735 | 12/1987 | Japan . |
| 62-197175 | 12/1987 | Japan . |
| 63-90445 | 4/1988 | Japan . |
| 49312 | 12/1993 | Japan ............ 359/630 |
| 8902611 | 3/1989 | WIPO . |

Primary Examiner—Thong Nguyen
Attorney, Agent, or Firm—Gordon R. Lindeen, III; Michael W. Sales; Wanda K. Denson-Low

[57] ABSTRACT

A virtual image instrument panel display (20) has a display source (22) and reflective elements (24, 26). The display source (22) generates a beam (28) including an image to be viewed. The reflecting elements (24, 26) receive the beam and provide a virtual image of the image of the beam. The virtual image is focused on a viewing plane at a predetermined and substantial virtual distance away from the user to enable easy eye focus transition between the virtual image and distant objects. The folded nature of the optical system provides for a compact package suitable for installation in an automotive dashboard.

10 Claims, 2 Drawing Sheets

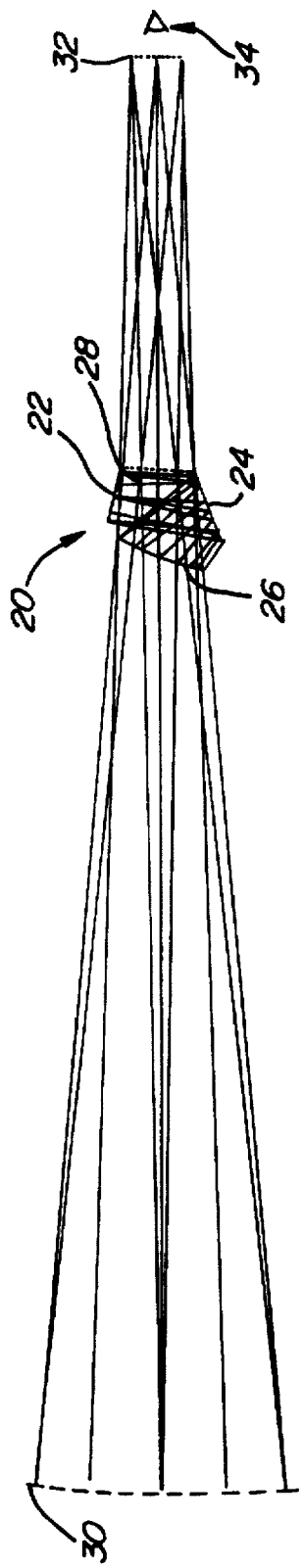
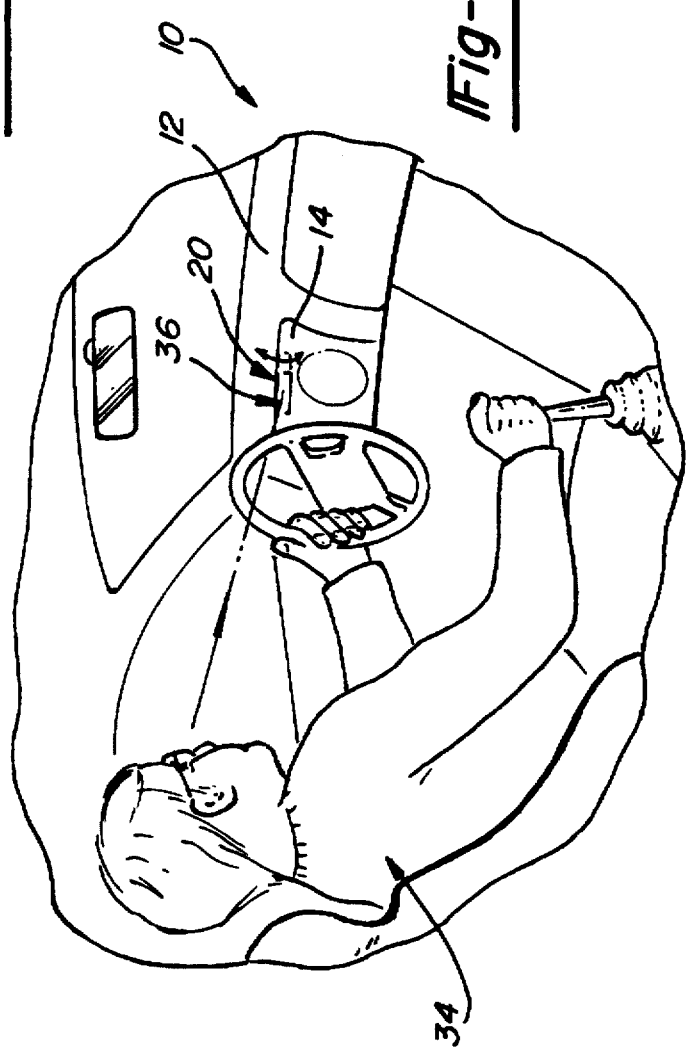

VIRTUAL IMAGE INSTRUMENT PANEL DISPLAY

This is a continuation application Ser. No. 07/971,799, filed Nov. 5, 1992, now abandoned.

BACKGROUND OF THE INVENTION

1. Technical Field

The present invention relates to instrument panels and, more particularly, to a virtual image instrument panel display having a wide field of view.

2. Discussion

When driving an automotive vehicle, the driver is constantly viewing the roadway ahead as well as the vehicle dashboard. Generally the dashboard includes gauges such as the speedometer, fuel, water and oil. The driver periodically reviews these gauges to insure that the vehicle is properly functioning.

While driving, the driver is constantly focusing and refocusing between the instrument panel, viewed at a close distance, and oncoming traffic, viewed at a long distance. This focusing and refocusing places strain on the eyes of the driver. Heretofore, the driver has had no choice to view the gauges at a distance substantially away from him since the gauges are within the passenger compartment.

This substantial distance, a few meters, provides an easier eye focus transition between oncoming traffic and the gauges. Thus, it is desirable to have a panel display which provides a virtual image at a predetermined virtual distance away from the driver so that the driver has an easier eye focus/refocus transition between the oncoming roadway and the instrument panel gauges.

SUMMARY OF THE INVENTION

According to the teachings of the present invention, an instrument panel display is provided which forms a virtual image at a predetermined virtual distance away from the viewer. The virtual image at the predetermined virtual distance enables easy eye focus transition between the instrument panel and the oncoming roadway. The invention provides a simple compact virtual image display ideal for an automotive instrument panel. The display is configured such that it would be positioned within the vehicle dashboard. The present invention enables adjustment of the display system to accommodate viewing by various drivers. Also, the display would enable the driver to quickly look back and forth from the instrument panel to the oncoming road without strainful eye adjustment. Also, the invention provides a wide field of view as well as a large viewing area with excellent image quality across the field of view.

In the preferred embodiment, the virtual image instrument panel display is comprised of the following. A display source generates a beam including an image to be viewed. The beam is directed towards a first mirror. The first mirror receives the beam and reflects it towards a second mirror. The two mirrors form a virtual image of the beam image to be viewed. The ray trace of the beam as it moves from the display source to the first mirror, second mirror and the driver is the shape of the numeral 4 on its side. By this description, it is meant that the optical path from the second mirror to the viewer is folded back through the optical path between the image source and the first mirror and further that these two intersecting optical paths cross at nearly right angles. The virtual image is provided at a viewing plane, for viewing by the driver, at a predetermined virtual distance which enables the driver to quickly look back and forth from the oncoming roadway to the instrument panel without significant eye adjustment.

BRIEF DESCRIPTION OF THE DRAWINGS

The various advantages of the present invention will become apparent to those skilled in the art after a study of the following specification and by reference to the drawings in which:

FIG. 1 is a schematic diagram of a vertical ray trace section of a display in accordance with the present invention;

FIG. 2 is a schematic view of a vehicle including a virtual image instrument display panel in accordance with the present invention;

DETAILED DESCRIPTION OF THE PREFERRED EMBODIMENT

Figure 3:
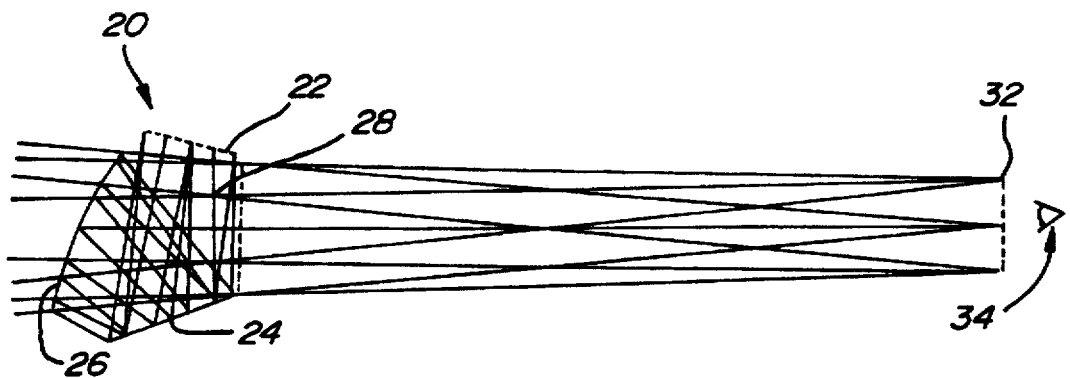
FIG. 3 is a partial schematic diagram of a vertical ray trace section of a display in accordance with the present invention.
Figure 4:
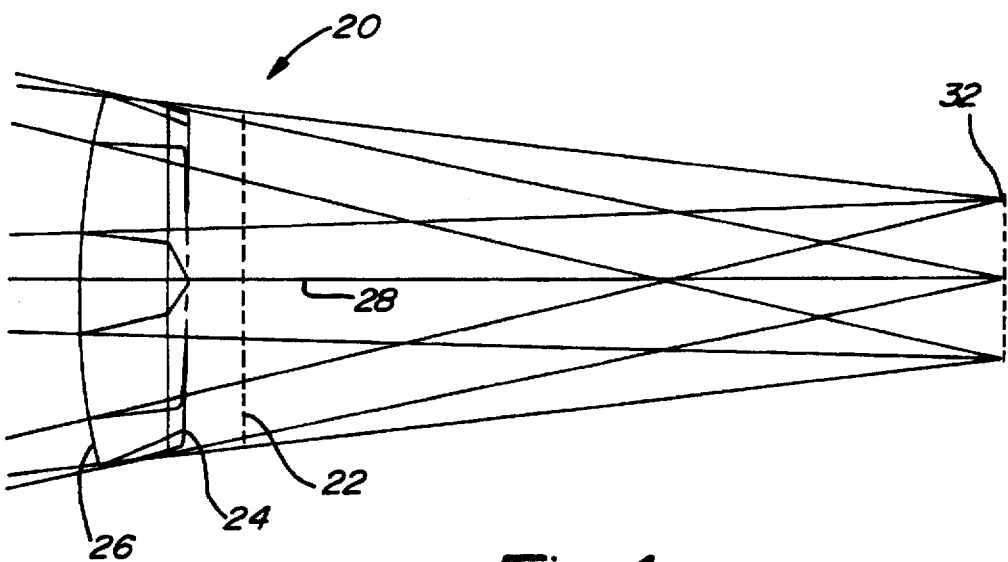
FIG. 4 is a partial schematic diagram, of a horizontal ray trace section of the display in accordance with the present invention.

Turning to the figures, particularly FIG. 2, a vehicle 10 is illustrated. The vehicle 10 includes a dashboard 12 with a compartment 14 that houses a vertical image instrument panel display illustrated in FIGS. 1, 3 and 4. The virtual image instrument panel display 20 generally includes a display source 22, a first mirror 24 and a second mirror 26. The display source 22 generates a light beam 28 which is directed towards the first mirror 24.

The display source 22 may provide all instrumentation needs in the vehicle. The display source 22 may provide the viewer with information regarding the speed of the vehicle, the water temperature, oil pressure, fuel reading or the like, or whatever information the driver may need. The driver would select the desired information to be displayed and this information would be generated by an image source, such as a CRT or a liquid crystal matrix, and then reflected through the system to be viewed by the driver. The driver would be able to view the gauges, dials, maps and/or thermal imagery from the vision enhancement system. Thus, the display 20 would become an integral part of a vision enhancement system equipment package.

The first mirror 24 receives the beam 28 from the display source 22 and reflects the beam towards the second mirror 26. The first mirror 24 may be an aspheric mirror, or it could be a powered mirror having an aspheric or higher order surface shape.

The second mirror 26 receives the beam from the first mirror 24 and reflects the beam towards the driver. The second mirror 26 is generally a positive power imaging mirror having an aspheric or higher order surface shape.

The first and second mirrors 24 and 26 act together to provide a virtual image of the generated beam. Both of the mirrors are generally non-rotationally symmetric aspheric mirrors whose surface shapes are described by Zernike polynomial expressions.

The mirrors form a large field of view having about a 10° field of view dimension in the vertical plane and about a 24° field of view in the horizontal plane. In turn, the field of view provides a 3 inch in vertical by 5 inches in horizontal plane for the viewing eye box area 32.

The mirrors 24 and 26 provide a virtual image on a viewing plane 30 located at a predetermined virtual distance away from the driver. Generally, the virtual distance may be from several feet to infinity. Preferably, the virtual image is formed at a virtual distance of at least 80 inches in front of the driver.

It should be noted that the beam trace from the source 22 to the first mirror 24 to the second mirror 26 and to the viewer 34 traces the shape of the numeral 4 on its side. By this description, it is meant that the optical path from the second mirror 26 to the viewer 34 is folded back through the optical path between the display source 22 and the first mirror 24 and further, that these two intersecting optical paths cross at nearly right angles. This provides the display with its compactness which enables the display to be fit within the dashboard of the vehicle. Generally, the entire package is about 7 inches high by 12 inches wide and 6 inches deep. Also, as seen in FIG. 2, a pivotal adjustment member 36 enables the entire display 20 to be pivoted about a horizontal axis to enable the display 20 to be moved to accommodate various heights of drivers to bring the exit pupil or eye box area to the driver's eye level.

The display 20 provides excellent image quality. Generally, the performance measures of such a biocular system, disparity and accuracy errors, are below the 1.0 milliradian level.

A specific prescription for the system in accordance with the present invention is as follows:

As is the custom in optical ray tracing, the prescription describes the optical system in an arrangement or order that progresses from the longer conjugate, at the virtual image, to the shorter conjugate, at the display source. This order or arrangement of ray tracing is exactly the opposite of the path actually followed by light from the source to the user's eye. Such inverse ray tracing is fully supported by the principle of reversibility of light.

| Description | Radius Inches | Aspheric | Tilt Degrees | Thickness Inches | Material | Size Inches (v × h) |
|---|---|---|---|---|---|---|
| Virtual Image | ∞ | — | — | 60.00 | Air | 14.0 × 32.8 |
| Eye Box | ∞ | — | — | −28.00 | Air | 3.0 × 5.0 |
| Second Mirror | 23.6218 | see Note A | −22.50 | 4.00 | Refl | 5.4 × 11.8 |
| First Mirror | ∞ | see Note B | −25.00 | −5.450 | Refl | 4.2 × 10.4 |
| Display Source | ∞ | — | −9.3436 | — | — | 2.85 × 5.27 |

| Note A | Note B |
|---|---|
| Z5 = −0.2615 × 10$^{-2}$ | Z5 = −0.1306 × 10$^{-1}$ |
| Z8 = −0.1099 × 10$^{-2}$ | Z8 = −0.3001 × 10$^{-2}$ |
| Z10 = 0.8978 × 10$^{-4}$ | Z10 = −0.9867 × 10$^{-4}$ |
| Z11 = 0.4021 × 10$^{-4}$ | Z11 = −0.1172 × 10$^{-3}$ |
| Z12 = −0.3311 × 10$^{4}$ | Z12 = 0.1156 × 10$^{-3}$ |
| Z14 = 0.6934 × 10$^{-5}$ | Z14 = 0.9444 × 10$^{-5}$ |
| Z17 = −0.4275 × 10$^{-5}$ | Z17 = 0.8885 × 10$^{-5}$ |
| Z19 = 0.7370 × 10$^{-6}$ | Z19 = −0.1117 × 10$^{-5}$ |
| Z21 = −0.1009 × 10$^{-6}$ | Z21 = 0.3001 × 10$^{-7}$ |
| Z22 = −0.8030 × 10$^{-6}$ | Z22 = 0.1737 × 10$^{-5}$ |
| Z23 = 0.2497 × 10$^{-7}$ | Z23 = −0.4879 × 10$^{-7}$ |
| Z24 = −0.2482 × 10$^{-9}$ | Z24 = 0.4165 × 10$^{-9}$ |

[(+) thicknesses are to the right; (+) radii have centers to the right; (+) decenters are up; (+) tilts are counterclockwise; decenters done before tilts] surface figure departures according to the equation:

$$Z = \frac{cs^2}{1 + \sqrt{1 - (K+1)c^2 s^2}} + ds^4 + es^6 + fs^8 + gs^{10}$$

where:
Z=surface SAG
c=1/RD
K=CC=Conic Constant=−(Eccentricity)$^2$
$s^2 = x^2 + y^2$ Sag of a surface designated as "Zern" surface is computed according to the following Zernike equation:

$$Z(x,y) = Z_{prev}(x,y) + \sum_{i=1}^{24} C_i Z_i(x,y)$$

where "$Z_{prev}$" is the sag function before this special surface definition.

$s^2 = x^2 + y^2$ and

| | | | |
|---|---|---|---|
| $Z_1(x,y) =$ | 1 = | 1 | Constant |
| $Z_2(x,y) =$ | s cos theta = | x | x - tilt |
| $Z_3(x,y) =$ | s sin theta = | y | y - tilt |
| $Z_4(x,y) =$ | $s^2$ = | $x^2 + y^2$ | Focus |
| $Z_5(x,y) =$ | $s^2$ cos 2theta = | $x^2 - y^2$ | 0° astigmatism (3$^{rd}$) |
| $Z_6(x,y) =$ | $s^2$ sin 2theta = | 2 x y | 45° astigmatism (3$^{rd}$) |
| $Z_7(x,y) =$ | $s^3$ cos theta = | $x(x^2 + y^2)$ | x - coma (3$^{rd}$) |
| $Z_8(x,y) =$ | $s^3$ sin theta = | $y(x^2 + y^2)$ | y - coma (3$^{rd}$) |
| $Z_9(x,y) =$ | $s^3$ cos 3theta = | $x(x^2 + 3y^2)$ | x - clover (3$^{rd}$) |
| $Z_{10}(x,y) =$ | $s^3$ sin 3theta = | $y(3x^2 - y^2)$ | y - clover (3$^{rd}$) |
| $Z_{11}(x,y) =$ | $s^4$ = | $(x^2 + y^2)^2$ | 3$^{rd}$ spherical |
| $Z_{12}(x,y) =$ | $s^4$ cos 2theta = | $x^4 - y^4$ | 0° astigmatism (5$^{th}$) |
| $Z_{13}(x,y) =$ | $s^4$ sin 2theta = | $2 x y (x^2 + y^2)$ | 45° astigmatism (5$^{th}$) |
| $Z_{14}(x,y) =$ | $s^4$ cos 4theta = | $x^4 - 6 x^2 y^2 + y^4$ | |
| $Z_{15}(x,y) =$ | $s^4$ sin 4theta = | $4 x y (x^2 - y^2)$ | |
| $Z_{16}(x,y) =$ | $s^5$ cos theta = | $x(x^2 + y^2)^2$ | x - coma (5$^{th}$) |
| $Z_{17}(x,y) =$ | $s^5$ sin theta = | $y(x^2 + y^2)^2$ | y - coma (5$^{th}$) |
| $Z_{18}(x,y) =$ | $s^5$ cos 3theta = | $x^5 - 2 x^3 y^2 - 3 x y^4$ | x - clover (5$^{th}$) |
| $Z_{19}(x,y) =$ | $s^5$ sin 3theta = | $3 x^4 y + 2 x^2 y^3 - y^5$ | y - clover (5$^{th}$) |
| $Z_{20}(x,y) =$ | $s^5$ cos 5theta = | $x^5 - 10 x^3 y^2 + 5 x y^4$ | |
| $Z_{21}(x,y) =$ | $s^5$ sin 5theta = | $5 x^4 y - 10 x^2 y^3 + y^5$ | |
| $Z_{22}(x,y) =$ | $s^6$ = | $(x^2 + y^2)^3$ | 5$^{th}$ spherical |
| $Z_{23}(x,y) =$ | $s^8$ = | $(x^2 + y^2)^4$ | 7$^{th}$ spherical |
| $Z_{24}(x,y) =$ | $s^{10}$ = | $(x^2 + y^2)^5$ | 9$^{th}$ spherical |

The present invention with its wide field of view capabilities can serve all instrumentation needs in a vehicle. The invention provides a simple two mirror design which allows full color imagery and which can be produced in large quantities at low cost using replication or molding techniques. Also while providing a wide field of view, the present invention provides a large eye view box with excellent image quality across the field. The present invention provides a compact size display easy to fabricate at relatively low cost with full color operation, excellent image quality and distortion closely matched to a visual enhancement system sensor optics.

It should be understood that while this invention has been described in connection with the particular example hereof, that various modifications, alterations and variations of the present embodiment can be made after having the benefit of the study of the specification, drawings and subjoined claims.

What is claimed is:

1. A virtual image instrument panel for a vehicle having a dashboard and an eyebox viewing area, said display comprising:

display source means for generating a beam including information; and reflecting means, responsive to said beam, for providing a virtual image of the information on a viewing plane at a predetermined virtual distance away from said eyebox viewing area, said reflecting means being housed within said dashboard, said reflecting means including a first non rotationally symmetric aspheric mirror defined by a first Zernike polynomial and a second positive non rotationally symmetric aspheric mirror defined by a second Zernike polynomial which cooperate to provide said virtual image, wherein said beam from said display source means crosses said beam reflected by said second positive aspherical mirror.

2. A virtual image instrument panel display comprising:

display source means for generating a beam including a source image;

a first non rotationally symmetric aspheric mirror defined by a first Zernike polynomial for receiving and reflecting said beam from said display source means; and a second non rotationally symmetric aspheric mirror defined by a second Zernike polynomial for receiving said beam from said first mirror and reflecting said beam from said first mirror towards an eyebox viewing area, said first and second mirrors cooperating to provide a virtual image of said source image on a viewing plane located at a predetermined virtual distance from said eyebox viewing area, wherein said beam from said display source means crosses said beam reflected by said second mirror.

3. The virtual image instrument panel display according to claim 2 wherein said first mirror is an aspheric mirror.

4. The virtual image instrument panel display according to claim 2 wherein said second mirror is a positive power imaging mirror.

5. The virtual image instrument panel display according to claim 2 wherein said virtual image is at said predetermined virtual distance away from said eyebox viewing area so that eye strain is reduced when a viewer refocuses from viewing said virtual image to viewing surrounding conditions.

6. The virtual image instrument panel display according to claim 5 wherein said predetermined virtual distance is about 80 inches or larger.

7. The virtual image instrument panel display according to claim 2 wherein the beams from said source and second mirror cross at substantially right angles.

8. The virtual image instrument panel display according to claim 2 wherein said eyebox viewing area is approximately 3 inches vertical by 5 inches horizontal.

9. The virtual image instrument panel display according to claim 2 wherein said virtual image instrument panel display is rotatably adjustable about a horizontal axis to provide for different heights of viewers.

10. The display according to claim 2 wherein said beam traveling between said display source means, said first mirror, said second mirror and said eyebox viewing traces an optical path that is configured in substantially the shape of a "4".

* * * * *